(12) United States Patent
Elliott et al.

(10) Patent No.: US 6,226,737 B1
(45) Date of Patent: May 1, 2001

(54) APPARATUS AND METHOD FOR SINGLE PRECISION MULTIPLICATION

(75) Inventors: Timothy A. Elliott; G. Glenn Henry, both of Austin, TX (US)

(73) Assignee: IP-First, L.L.C., Fremont, CA (US)

( * ) Notice: Subject to any disclaimer, the term of this patent is extended or adjusted under 35 U.S.C. 154(b) by 0 days.

(21) Appl. No.: 09/116,189

(22) Filed: Jul. 15, 1998

(51) Int. Cl.⁷ .................................................. G06F 9/302
(52) U.S. Cl. .......................... 712/222; 708/501; 708/503
(58) Field of Search .................................. 708/523, 625, 708/626, 627, 628, 629, 630, 631, 632, 501, 503; 712/222

(56) References Cited

U.S. PATENT DOCUMENTS 5,036,482 * 7/1991 Saini ...................................... 708/632
5,623,683 * 4/1997 Pandya ................................. 708/625

* cited by examiner

Primary Examiner—William M. Treat
(74) Attorney, Agent, or Firm—Richard K. Huffman; James W. Huffman

(57) ABSTRACT

An apparatus and method for performing single precision multiplication in a microprocessor are provided. The apparatus includes translation logic and extended precision floating point execution logic. The translation logic decodes a single precision multiply instruction into an associated micro instruction sequence directing the microprocessor to fetch a single precision operand from memory and convert it to extended precision format. In addition, the associated micro instruction sequence directs floating point execution logic employing a dual pass multiplication unit to skip a pass associated with computing an insignificant partial product. This insignificant partial product would otherwise result from multiplication of a multiplicand by zeros which are appended to the significand of the fetched operand when it is converted to extended precision format.

19 Claims, 7 Drawing Sheets

APPARATUS AND METHOD FOR SINGLE PRECISION MULTIPLICATION

BACKGROUND OF THE INVENTION

1. Field of the Invention

This invention relates in general to the field of data processing in computers, and more particularly to an apparatus and method for multiplying single precision binary operands.

2. Description of the Related Art

Software programs that execute on a microprocessor consist of macro instructions that together direct the microprocessor to perform a function. Each macro instruction directs the microprocessor to perform a specific operation that is part of the function such as loading data from memory, storing data in a register, or adding the contents of two registers.

A macro instruction may prescribe a simple operation, such as moving the contents of one register location to another register location. In contrast, a different macro instruction may prescribe a complex operation, such as deriving the cosine of a floating point number. Compared to the manipulation of integer data, the manipulation of floating point data by the microprocessor is complex and time consuming. Movement of integer data requires only a few cycles of a microprocessor clock; derivation of a cosine requires hundreds of machine cycles. Because floating point operations are basically more complex than integer operations, typical microprocessors employ a dedicated floating point unit to improve the speed and efficiency of floating point calculations. The dedicated floating point unit may be part of the same mechanical package as the remainder of the microprocessor or it may reside in a separate mechanical package.

Within an x86-compatible microprocessor, a floating point macro instruction is decoded into a sequence of floating point micro instructions that direct the microprocessor to execute a floating point operation. The sequence of floating point micro instructions is passed to the floating point unit. The floating point unit executes the sequence of floating point micro instructions and provides a result of the floating point operation in a result register. Likewise, an integer macro instruction is decoded into a sequence of integer micro instructions that direct the microprocessor to execute an integer operation. The sequence of integer micro instructions is passed to the integer unit. The integer unit executes the sequence of integer micro instructions and provides a result of the integer operation in a result register.

In recent years, desktop computational demands have placed a greater burden upon microprocessor designers to add increasingly more functionality to a microprocessor's instruction set. In fact, floating point operations are so common now that a vast majority of present day floating point units perform their computations on operands which adhere to industry standard extended precision format. A number in extended precision format has a 64-bit significand. To implement extended precision capability in a floating point unit essentially requires adding more logic circuits to a device. But the additional logic results in a greater power requirement, which is inversely proportional to device reliability. Consequently, microprocessor designers are now searching for alternative ways to add functions to a device. Designers now use existing logic to perform new functions, or they eliminate redundant logic and redistribute existing functions to remaining logic. One example of an alternative is seen in the implementation of logic to perform floating point multiplication.

A basic floating point multiplication unit multiplies a 64-bit multiplicand by a 64-bit multiplier. Recognizing the benefits inherent in reducing the size of the multiplication unit, microprocessor designers today provide multiplication units on the order of 64-bits by 32-bits. These are commonly called dual pass multiplication units. A lower half of the multiplier in a first pass is multiplied with the multiplicand to form a first partial product. Following this, an upper half of the multiplier in a second pass is multiplied with the multiplicand to form a second partial product. The second partial product is left-shifted accordingly and summed with the first partial product to yield a final product. By such an implementation, the logic requirements for extended precision multiplication are roughly halved with only a slight increase in the number of machine cycles required to compute a product.

Yet, there are a significant number of extant software applications for which single precision multiplication is sufficient. A single precision number comprises a 24-bit significand. When a single precision number is provided to an extended precision floating point unit, it is translated into extended precision format. But this translation results in the lower 40 bits of its significand being equal to zero. Hence, multiplication of a single precision number in a dual pass multiplication unit will take two passes, but, the first pass is essentially wasted because it is consumed multiplying a 64-bit multiplicand by zero.

Therefore, what is needed is an apparatus for performing single precision multiplication in a microprocessor faster than has heretofore been provided.

In addition, what is needed is a microprocessor that executes a single precision multiplication that requires only one pass through a dual pass multiplication unit.

Furthermore, what is needed is a method for performing single precision multiplication in a microprocessor that eliminates unnecessary clock cycles associated with the performance of extended precision multiplication.

SUMMARY

To address the above-detailed deficiencies, it is an object of the present invention to provide an apparatus in a microprocessor that performs single precision multiplication faster than conventional dual pass multiplication units.

Accordingly, in the attainment of the aforementioned object, it is a feature of the present invention to provide a microprocessor for performing single precision floating point multiplication of a multiplicand by a multiplier, where the multiplicand and the multiplier are provided in extended precision format. The microprocessor includes a translator and extended precision floating point execution logic. The translator receives a single precision multiplication instruction, and decodes the single precision multiplication instruction into an associated single precision micro instruction sequence. The extended precision floating point execution logic is coupled to the translator. The extended precision floating point execution logic receives the associated single precision micro instruction sequence, and multiplies the multiplicand by the multiplier to generate a single precision product. The extended precision floating point execution logic normally performs a floating point multiplication by generating a low-order partial product followed by generation of a high-order partial product, where the low-order partial product represents multiplication of a low-order part of an extended precision multiplier with an extended precision multiplicand, and where the high-order partial product represents multiplication of a high-order part of the extended precision multiplier with the extended precision multiplicand The low-order partial product is generated during a first traversal through the extended precision floating point execution logic, and the high-order partial product is generated during a second traversal through the extended precision floating point execution logic. When the associated single precision micro instruction sequence is received, the extended precision floating point execution logic generates the single precision product by executing only the second traversal to generate the high-order partial product, the high-order partial product being the single precision product.

An advantage of the present invention is that single precision multiplication requires roughly half of the execution time of extended precision multiplication.

Another object of the present invention is to provide a microprocessor that executes a single precision multiplication without requiring two passes through a dual pass multiplication unit.

In another aspect, it is a feature of the present invention to provide an apparatus in a microprocessor for performing single precision multiplication of a multiplicand by a multiplier. The apparatus has a translator and extended precision floating point execution logic. The translator receives a single precision multiplication instruction, and decodes the single precision multiplication instruction into an associated single precision micro instruction sequence. The extended precision floating point execution logic is coupled to the translation logic. The extended precision floating point execution logic receives and executes the associated single precision micro instruction sequence. The extended precision floating point execution logic includes a multiplication unit. The multiplication unit performs two-pass extended precision multiplication and one-pass single precision multiplication, and multiplies the multiplicand by the multiplier to generate a single precision product, where the multiplicand and the multiplier are provided to the multiplication unit in extended precision format.

In yet another aspect, it is a feature of the present invention to provide a microprocessor for performing single precision multiplication. The microprocessor includes a translator and floating point execution logic. The translator receives a single precision multiplication instruction, and decodes the single precision multiplication instruction into an associated single precision micro instruction sequence. The associated single precision micro instruction sequence has a single precision load micro instruction sequence, directing the microprocessor to retrieve an operand from a memory address and to convert the operand into an extended precision multiplier. The associated single precision micro instruction sequence also has a single precision multiply micro instruction sequence, directing single precision multiplication of an extended precision multiplicand by the extended precision multiplier. The floating point execution logic is coupled to the translation logic. The floating point execution logic receives and executes the single precision multiply micro instruction sequence. The floating point execution logic includes a multiplication unit. The multiplication unit performs two-pass extended precision multiplication and one-pass single precision multiplication, and multiplies the multiplicand by the multiplier to generate a single precision product, where the multiplicand and the multiplier. are provided to the multiplication unit in extended precision format.

Another advantage of the present invention is that applications programs with significant numbers of single precision multiplications will not exhibit program delays associated with wasted computations.

Yet another object of the present invention is to provide a method for performing single precision multiplication in a microprocessor that eliminates unnecessary clock cycles associated with the performance of extended precision multiplication.

In a further aspect, it is a feature of the present invention to provide a method in a microprocessor for performing single precision multiplication of a multiplicand by a multiplier. The method includes translating a floating point single precision multiply instruction into an associated single precision multiply micro instruction sequence which prescribes single precision multiplication of a multiplicand by a multiplier, the multiplicand and the multiplier being registered in the microprocessor as extended precision operands; and performing the single precision multiplication to produce a single precision product in a single pass through an extended precision multiplication unit, the extended precision multiplication unit being configured to perform multiplication of two extended precision operands in two passes through the multiplication unit.

Yet another advantage of the present invention is that execution of single precision multiply instruction requires roughly half machine cycles of that which has heretofore been demonstrated in the art.

BRIEF DESCRIPTION OF THE DRAWINGS

These and other objects, features, and advantages of the present invention will become better understood with regard to the following description, and accompanying drawings where.

DETAILED DESCRIPTION

In light of the above background on techniques for performing floating point multiplication in a microprocessor, several related art examples will now be described with reference to FIGS. 1 through 5. These examples illustrate the problematic nature of present day floating point multiplication techniques when employed in an x86-compatible microprocessor. Following this discussion, a detailed description of the present invention will be provided with reference to FIGS. 6 through 8. Use of the present invention allows single precision floating point multiplication to be performed using dual pass floating point multiplication hardware in a microprocessor much faster than has heretofore been attained.

Figure 1:
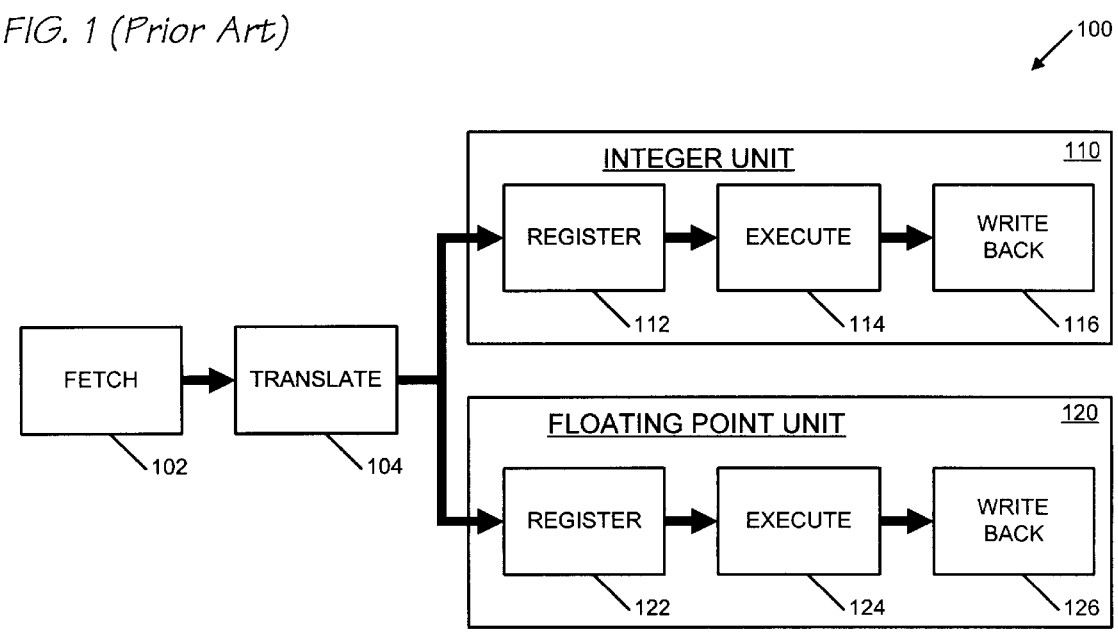
FIG. 1 is a block diagram of pipeline microprocessor featuring parallel execution units.

Referring to FIG. 1, a block diagram of a related art pipeline microprocessor 100 is presented. The microprocessor 100 includes a fetch stage 102, a translate stage 104, an integer unit 110, and a floating point unit 120. The floating point unit 120 is in parallel with the integer unit 110. The integer unit 110 has three stages: register 112, execute 114, and write back 116. The floating point unit 120 has three like stages: register 122, execute, 124, and write back 126.

Operationally, the fetch stage 102 fetches macro instructions from memory (not shown) for execution by the microprocessor 100. The translate stage 104 translates, or decodes, a fetched macro instruction into associated micro instructions, each directing the microprocessor to perform a specific subtask related to accomplishment of a higher level operation, which is specified by the fetched macro instruction. Because of fundamental differences between operations involving integers and operations involving floating point numbers, microprocessor designers have historically segregated hardware and associated macro instructions for the performance of floating point subtasks from that required to perform integer subtasks.

Thus, the translate stage 104 decodes a floating point macro instruction into a sequence of floating point micro instructions to accomplish a specified floating point operation. Likewise, the translate stage 104 decodes an integer macro instruction into a sequence of integer micro instructions to accomplish a specified integer operation. The integer micro instructions are passed from the translate stage 104 to the integer unit register stage 112. The integer unit register stage 112 retrieves operands specified by the integer micro instructions from a register file (not shown) for use by later stages in the integer pipeline. The integer unit execute stage 114 executes subtasks specified by the integer micro instructions. Examples of subtasks performed by the execute stage 114 include address calculation, integer arithmetic, and retrieval/storage of data from/to memory. The integer unit write back stage 116 writes results of the executed subtasks back into the register file.

Likewise, the floating point micro instructions are passed from the translate stage 104 to the floating point unit register stage 122. The floating point unit register stage 122 retrieves operands prescribed by the floating point micro instructions from a floating point register file (not shown), for use by later stages in the floating point pipeline. The floating point unit execute stage 124 executes floating point subtasks specified by the floating point micro instructions. Examples of subtasks performed by the floating point execute stage 124 include floating point arithmetic, square root, and transcendental functions (i.e., sine, cosine, etc.). The floating point unit write back stage 126 writes results of the executed subtasks back into the floating point register file.

Micro instructions move through successive stages of the microprocessor pipeline in synchronization with a microprocessor clock. Optimally, while any given stage in the pipeline is executing a micro instruction, the previous stage should be executing the next, or following, micro instruction. If a preceding micro instruction within one stage requires more than one cycle to completely execute, then following micro instructions are stalled until execution of the preceding micro instruction is completed. When a stall occurs, pipeline slips are inserted into the pipeline to insure that the following micro instructions do not prematurely advance in the pipeline.

In contrast to the integer unit 110, the floating point unit 120 has complex computational logic that is dedicated to performing intensive floating point data manipulations. For example, addition of two integers takes roughly one cycle of a microprocessor clock in the integer unit 110 while execution of a cosine operation takes hundreds of clock cycles in the floating point unit 120.

As desktop computing systems have become increasingly more ubiquitous in the workplace, requirements for microprocessor instructions that execute complex computational operations have placed more of a burden on floating point hardware to execute these instructions without undue delay. In fact, floating point arithmetic instructions are so common now that most microprocessors process floating point data in accordance with accepted industry standards. These standards denote various formats for binary representation of floating point numbers along with rules for interpreting results of a computation. And while these standards have served to promote increased precision and consistency with regard to floating point computations, the disadvantages of standardization are manifest in terms of program execution delays.

For example, multiplication of two floating point numbers in an x86-compatible microprocessor is performed in a standard floating point multiplication unit (not shown), which is located within the floating point execute stage 124. Those skilled in the art will appreciate that this standard multiplication unit multiplies two 64-bit operands, a multiplicand and a multiplier, and yields a 64-bit product. To more completely describe the computational aspects of floating point multiplication, FIG. 2 is presented.

Figure 2:
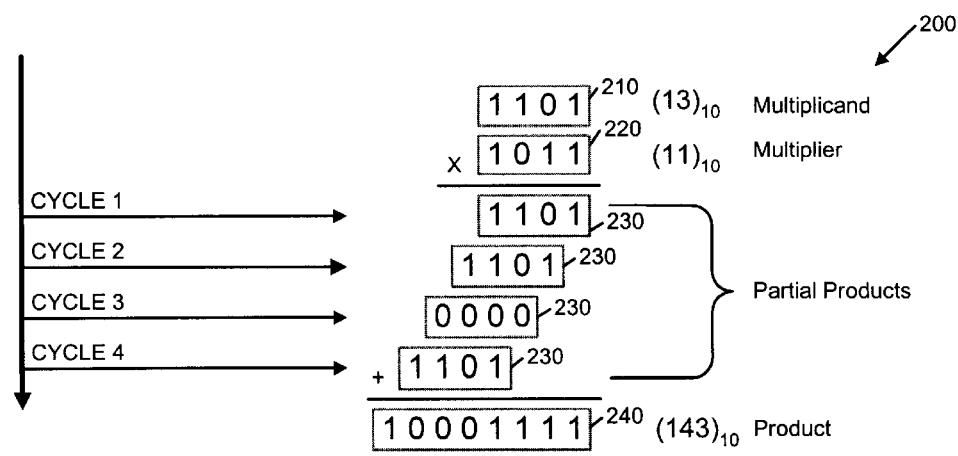
FIG. 2 is a diagram illustrating multiplication of a 4-bit muliplicand by a 4-bit multiplier.

FIG. 2 is a diagram 200 illustrating longhand binary multiplication of an 4-bit binary multiplicand 210 by a 4-bit binary multiplier 220. The result of the multiplication is a product 240. Longhand binary multiplication is accomplished by a series of shifts and additions. Each cycle within the series represents one instance of a shift and addition. Each bit of the multiplier 220 determines whether the multiplicand 210, shifted left according to the position of the multiplier bit, will be added into the product 240.

During cycle 1, because the least significant bit of the multiplier 220 is 1, the multiplicand 210 is brought down as a partial product 230 so that it may be added into the product 240.

During cycle 2, because the bit to the left of the least significant bit of the multiplier 220 is 1, the multiplicand 210, shifted left by one more bit, is again brought down as a partial product 230 for incorporation into the product 240.

During cycle 3, because the next ascending bit of the multiplier 220 is 0, the multiplicand 210 is not brought down as a partial product 230 for addition into the product 240. Rather, zeros are brought down.

During cycle 4, because the bit to the most significant bit of the multiplier 220 is 1, the multiplicand 210, shifted left to align with the position of the most significant bit of the multiplier 220, is again brought down as a partial product 230 so that it may be added into the product 240.

The four partial products 230 are summed to form the product 240. Although the diagram 200 depicts a sum to form the product 240 following cycle 4, those skilled in the art will appreciate that the product can be iteratively generated during each successive cycle as well.

Conventional binary multiplication in a microprocessor is accomplished in very much the same manner as longhand multiplication. The multiplicand 210 and multiplier 220 are placed in registers within a multiplication unit, i.e., a logic device dedicated to performing binary multiplication. Following this, a series of shift-and-add operations are executed as described above, where each cycle of the multiplication operation requires approximately one cycle of the pipeline clock to execute. Diverse implementations of conventional binary multiplication units exist today, however, they all employ variations of the shift-and-add methodology described above. For this reason, it is customary for those skilled in the art to compare binary multiplication units in terms of the number of cycles that are required for execution. For the standard floating point multiplication unit noted above, 64 cycles of the microprocessor clock are required to generate a product, one cycle for each bit in the multiplier.

To reduce the number of cycles required to perform a multiplication, most present day microprocessors employ hardware to implement the well-known Booth Algorithm. A complete discussion of the algorithm is beyond the scope of this paper, however, it is sufficient to note that such hardware recodes a multiplier to identify only the boundaries of successive strings of zeros and ones, these boundaries being the only points in the multiplication process where operations other than shifting are essential. By doing so, the number of cycles required to execute a multiplication are reduced by 50 percent, at least.

In addition to reducing execution time for instructions, microprocessor designers are also faced with the demand to minimize design complexity, power consumption, and cost of a microprocessor. Although the Booth Algorithm can be implemented with rather minor penalties in terms of complexity, power, and cost, many present day microprocessors have achieved more notable savings by reducing the size of their multiplication unit. For example, the standard multiplication unit handles a 64-bit multiplicand and a 64-bit multiplier. A dual-pass multiplication unit simply eliminates all multiplication hardware associated with processing an upper part of the multiplier, say, the upper 32-bits. The low-order 32 bits of the 64-bit multiplier are provided in a first pass to the multiplication unit. Following this, the high-order 32 bits of the 64-bit multiplier are provided in a second pass to the multiplication unit. The result of the second pass is then left shifted by 32 bits and added to the result of the first pass to form a final product. Employing a dual pass multiplication unit provides the savings noted above with very minimal additions to the number of cycles required to perform multiplication of standard format operands. Hence, use of the Booth Alcorithm in a dual pass multiplication unit provides an attractive return in terms of execution time, power, cost, and design complexity for a given microprocessor, especially when the rather minor implementation costs are noted.

Present day dual pass multiplication units do not necessarily halve the size of the multiplier bits; they sometimes employ more bits of the multiplier. A common dual pass multiplication unit processes a 64-bit multiplicand and a 40-bit multiplier. It is thus called a 64-bit×40-bit dual pass multiplication unit.

In spite of the achievements cited above, there remain execution speed problems inherent in an x86-compatible microprocessor that performs floating point multiplication via a dual pass multiplication unit. This is because dual pass multiplication units are designed to multiply 64-bit operands in accordance with a particular industry standard format. But, industry standards allow other formats as well which, when exercised in a dual pass multiplication unit, result in a significant number of wasted pipeline cycles. These formats are presented with reference to FIG. 3 in order to convey a more complete understanding of the problem.

Figure 3:
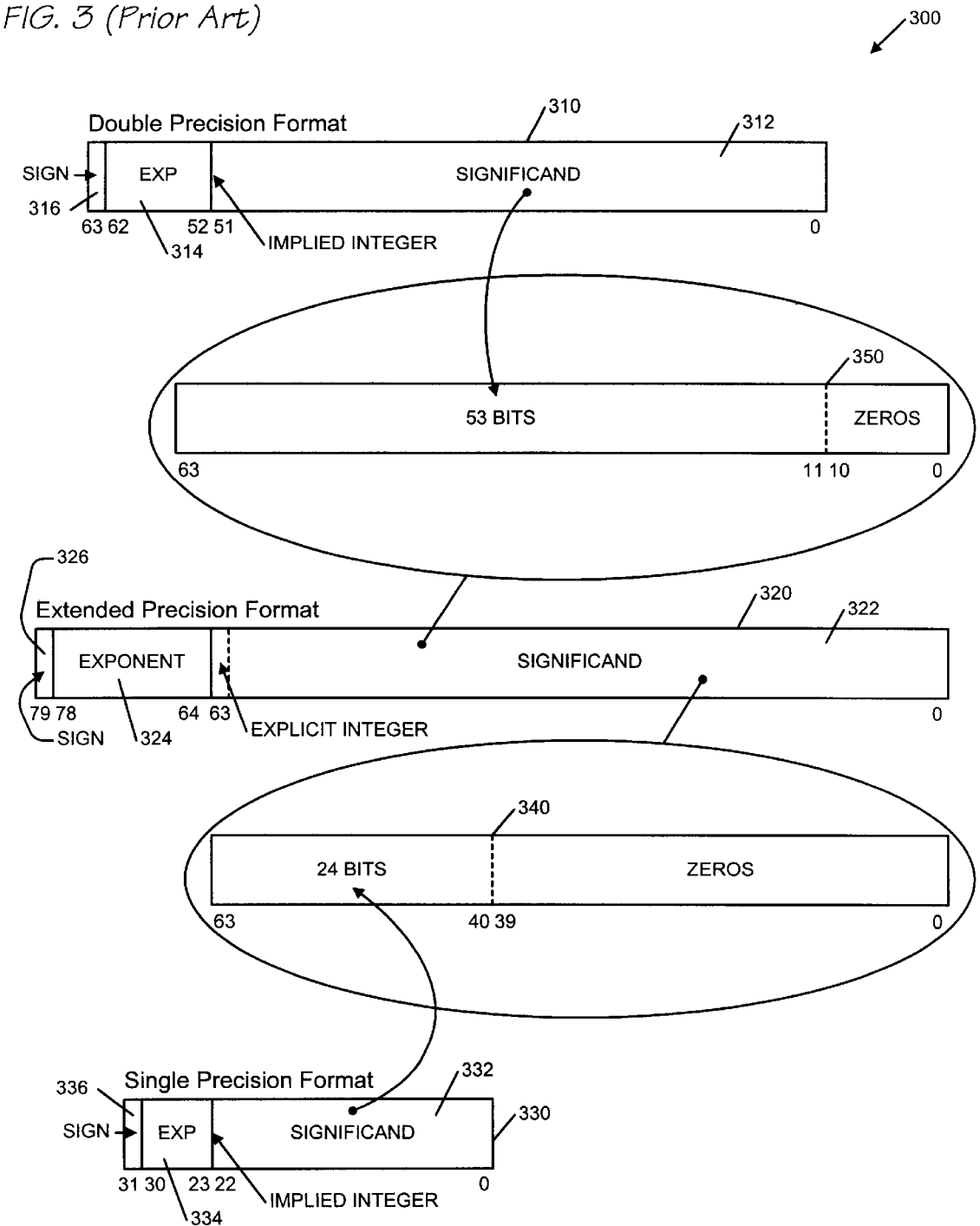
FIG. 3 is a diagram depicting standard formats for floating point numbers.

Referring to FIG. 3, a diagram 300 is presented illustrating the industry standard formats for floating point numbers. The standard most widely adhered to in x86-compatible applications is 754–1985, *IEEE Standard for Binary Floating-Point Arithmetic*. The diagram 300 presents three commonly used formats from the standard: double precision format 310, extended precision format 320, and single precision format 330. Standard x86-compatible multiplication units operate on operands in the extended precision format 320, but floating point numbers can be stored in memory in any of the three formats 310, 320, 330. Thus, the diagram 300 also depicts an extended precision significand 340 resulting from translation of a number in the single precision format 330 and an extended precision significand 350 resulting from translation of a number in the double precision format 310.

A floating point number stored in the single precision format 330 includes a sign bit 336, an 8-bit exponent 334, and a 24-bit significand 332. The sign bit 336 indicates whether the number is positive or negative. The exponent 334 is a biased indication of the power of base two to which the significand 332 is raised. The significand 332 includes an integer part and a fraction part. With the exception of the number zero, the integer part for all encoded floating point numbers is equal to one. And since zero has a unique encoding, i.e., both the exponent 334 and the fraction part are set to zero, then it is not necessary to explicitly store the integer part. Consequently, the diagram 300 shows that the integer part is implied in the single precision format 330 rather than explicitly depicted.

A floating point number stored in the double precision format 310 includes a sign bit 316, an 11-bit exponent 314, and a 53-bit significand 312. The sign bit 316 indicates whether the number is positive or negative. The exponent 314 is a biased indication of the power of base two to which the significand 312 is raised. The significand 313 includes an integer part and a fraction part. Like the single precision format 330, the integer part of the double precision format 310 is implied rather than explicitly depicted.

A floating point number in the extended precision format 320 includes a sign bit 326, a 15-bit exponent 324, and a 64-bit significand 322. The sign bit 326 indicates whether the number is positive or negative. The exponent 324 is a biased indication of the power of base two to which the significand 322 is raised. The significand 322 includes an integer part and a fraction part. Unlike the single or double precision format 330, 310, the extended precision format explicitly depicts the integer part of an encoded floating point number.

In an x86-compatible microprocessor, numbers may be stored in the single precision format 330 and the double precision format 310 only in memory. As a number is read into a floating point register file, it is translated into the extended precision format 320. All floating point operations are performed on numbers in extended precision format 320 to produce results in extended precision format 320. An extended precision result may be written to memory in any of the three standard formats 310, 320, 330. When it is written to memory in single or double precision format 330, 310, the extended precision result is appropriately rounded.

When a number in double precision format 310 is translated to extended precision format 320, its significand 350 includes the 53-bit significand 312 with 11 zeros appended. When a number in single precision format 330 is translated to extended precision format 320, its significand 340 includes the 24-bit significand 332 with 40 zeros appended. A dual pass multiplication unit is designed to multiply extended precision significands 322. And if a multiplier and multiplicand are provided in memory in extended precision format 320 or in double precision format 310, then both passes of the multiplier through the dual pass multiplication unit produce significant partial products. However, if the multiplier and multiplicand are provided in memory in single precision format 330, then the first pass of the multiplier through the dual pass multiplication unit produces an insignificant partial product. This is because the lower 40 bits of the significand 340 are zeros. Consequently, for a 64-bit x 40-bit dual pass multiplication unit, the first pass essentially consumes 40 useless pipeline cycles. A lesser number of cycles are wasted when Booth recoding is employed, but they are, nevertheless, consumed by an unnecessary pass through the multiplication unit. A less abstract example of how an x86-compatible microprocessor executes single precision floating point multiplication is presented in FIG. 4.

Figure 4:
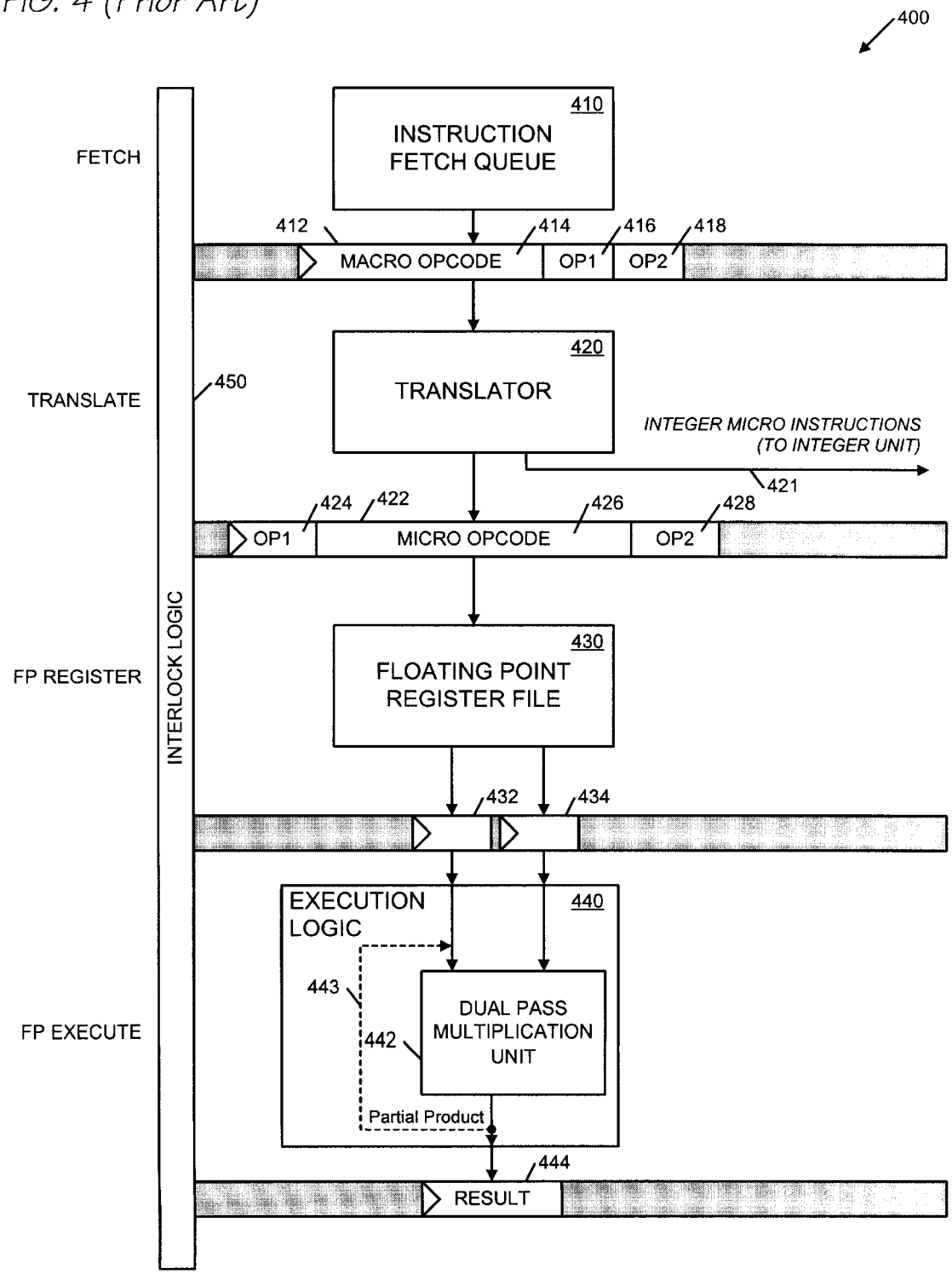
FIG. 4 is a block diagram of a floating point pipeline path in a related art microprocessor for performing single precision multiplication.

FIG. 4 a block diagram of a floating point pipeline path in a related art microprocessor 400 for executing a single precision multiply instruction. For clarity, integer stages of the microprocessor 400 are not shown because they are not relevant to this discussion. The block diagram shows four pipeline stages associated with execution of the single precision multiply instruction: fetch, translate, floating point register, and floating point execute. A floating point write back stage is not shown because it also is not relevant to this discussion. Although a specific microprocessor may segregate its floating point unit differently into slightly more or less stages, one skilled in the art, nonetheless, will appreciate that the stages shown in FIG. 4 are representative of a typical microprocessor 400. The microprocessor 400 also includes interlock logic 450.

The fetch stage has an instruction fetch queue 410 connected to an instruction buffer 412. The translate stage has a translator 420 that provides an output to a floating point micro instruction buffer 422. The register stage has a floating point register file 430. Outputs of the floating point register file 430 are provided to first and second floating point operand registers 432, 434. The floating point execute stage includes floating point execution logic 440, which receives inputs from the first and second operand registers 432, 434. The floating point execution logic 440 includes a dual pass multiplication unit 442 and provides its output to a floating point result register 444. The contents of the result register 444 are provided to the write back stage so that they may be written back into the floating point register file 430 or into memory (not shown) when a micro instruction completes execution.

In operation, the instruction fetch queue 410 fetches macro instructions from memory (not shown) for execution by the microprocessor 400. The macro instructions are sequentially provided to the instruction buffer 412. The instruction buffer 412 has three fields: a macro opcode field 414, a first macro operand field 416, and a second macro operand field 418. In the case of a single precision multiply macro instruction, the macro opcode field 414 directs the microprocessor 400 to multiply a multiplicand, which has been previously stored in an architecturally defined register, by a multiplier. A memory address of the multiplier is prescribed by the first macro operand field 416. The second micro operand field 418 does not contain an operand in the case of a single precision multiply instruction.

The translator 420 retrieves a macro instruction from the macro instruction buffer 412 and decodes it into an associated sequence of micro instructions. Micro instructions directed to the integer unit (not shown) are provided on bus 421. Micro instructions directed to the floating point unit are provided to the floating point micro instruction buffer 422. The floating point micro instruction buffer 422 has three fields. Contents of a micro opcode field 426 direct the floating point unit to perform a specific subtask. Operands are provided in first and second micro operand fields 424, 428. In the event of a single precision multiply micro instruction, the micro operand fields 424, 428 would contain references to specific registers in the floating point register file 430 for execution of the multiplication. Thus, micro instructions are provided to the floating point unit of the microprocessor 400.

If the micro opcode so directs, contents of the floating point register file 430 are retrieved and placed into the first and second operand registers 432, 434. For a single precision multiply micro instruction, the multiplicand and multiplier, placed into the floating point register file 430 by preceding micro instructions, are retrieved and placed into the first and second operand registers 432, 434.

The floating point execution logic 440 retrieves the contents of registers 432 and 434 and executes the subtask specified by the micro opcode. For execution of a single precision multiply micro instruction, the multiplicand and multiplier are retrieved from the registers 432, 434 and are provided to the dual pass multiplication unit 442 in extended precision format. Thereafter, an extended precision multiplication operation is executed. As described above, a first part of the multiplier is passed through the dual pass multiplication unit 442 to compute a first partial product. The first partial product is provided on bus 443 and registered for generation of a final product. Following this, a remaining part of the multiplier is passed through the dual pass multiplication unit 442 to compute a second partial product. The second partial product is left shifted accordingly and summed with the first partial product to generate the final product. The final product is placed in the result register 444.

Because the single precision multiplication operation requires numerous pipeline cycles while in the dual pass multiplication unit 442, the interlock logic 450 inserts slips into the pipeline to preclude following instructions from prematurely advancing in the pipeline. Execution of a single precision multiply instruction is more completely illustrated with reference to FIG. 5.

Figure 5:
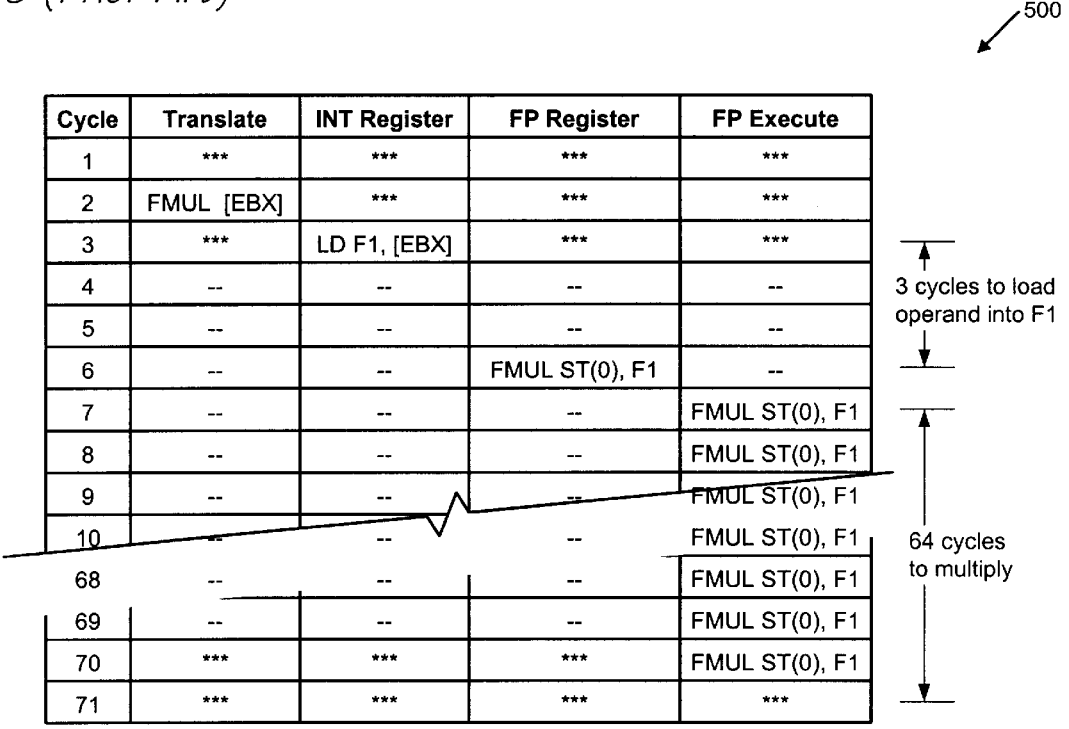
FIG. 5 is a table illustrating execution of a single precision multiplication instruction by the microprocessor of FIG. 4.

FIG. 5 is a table 500 illustrating execution of a single precision multiply instruction by the microprocessor 400 of FIG. 4. The single precision multiply instruction is designated by FMUL [EBX]. It directs the microprocessor 400 to perform integer division of a multiplicand contained in floating point register ST(0) by a single precision multiplier contained at a memory address prescribed by the contents of register EBX in the integer register file. In accordance with the technique for single precision multiplication described with reference to FIG. 4, the translator 420 decodes the single precision multiply instruction into a single precision load micro instruction, designated by LD F1, [EBX], and a single precision multiply micro instruction, designated by FMUL ST(0),F1. The single precision load micro instruction directs the microprocessor 400 to fetch the contents of the memory address prescribed by register EBX in the integer register file and place the contents in register F1 in the floating point register file 430. Although not shown in FIG. 4, conventional microprocessors have an inter-unit bus that permits the transfer of operands from the integer unit to the floating point unit. The single precision multiply micro instruction directs the floating point unit to multiply the multiplicand, previously loaded into register ST(0) in the floating point register file 430, by the multiplier that is stored in register F1.

Progression of the micro instructions through the microprocessor 400 is shown with respect to cycles of a pipeline clock. Instructions before and after instructions of interest are designated by "***." Voids, or slips in the pipeline are designated by "--." For clarity, FIG. 5 only depicts those stages of the microprocessor pipeline that are relevant to this discussion. Hence, the fetch stage and write back stage are not shown. The integer register stage is shown, however, because the single precision load micro instruction is provided via bus 421 to the integer unit so the multiplier can be fetched from memory.

During cycle 2, the single precision multiply instruction, FMUL [EBX], proceeds through the translate stage of the pipeline. Therein, the translator 420 retrieves it from the macro instruction buffer 412 and decodes it into the two micro instructions described above.

During cycle 3, the single precision load micro instruction, LD F1, [EBX], proceeds through the integer register stage. The table 500 does not depict the operations in the integer unit related to retrieving the multiplier because they are not relevant to the discussion. The table 500 does show, though, that three cycles of the pipeline clock are required the integer unit to load the multiplier into register F1. One skilled in the art will acknowledge that three cycles is typical for such an operation. Consequently, contents of the memory address prescribed by the contents of register EBX, which are the single precision multiplier, are placed into register F1 of the floating point register file 430. As discussed above, although the multiplier is in single precision format in memory, it is translated into extended precision format when provided to register F1: the 40 least significant bits of the significand of register F1 contain zeros. Also during cycle 3, a following macro instruction proceeds through the translate stage.

Because the multiplication operation cannot begin until the multiplier is placed into register F1, the interlock logic 450 inserts slips into the pipeline during cycles 4 and 5. At this point execution of the single precision load micro instruction is complete insofar as concerns this discussion.

During cycle 6, the single precision multiply micro instruction proceeds through the floating point register stage. Therein, the previously stored multiplicand is retrieved from register ST(0) in the register file 430 and is placed into register 432. Also, the multiplier is retrieved from register F1 and is placed in register 434.

During cycle 7, the single precision multiply micro instruction proceeds through the floating point execute stage. Therein, the multiplicand and multiplier are retrieved from registers 432, 434. The lower part of the multiplier is provided to the dual pass multiplication unit 442 along with the multiplicand.

Roughly half of the multiply cycles shown in the table 500 is required to form the first partial product, which is fed back via bus 443 and registered. The remaining half of the indicated cycles is required to form the second partial product and to generate the final product. The table 500 shows 64 pipeline cycles dedicated to generation of the final product, which represents two passes through a 64-bit×32-bit dual pass multiplication unit 442. One skilled in the art will concur that 64 cycles is typical for a dual pass multiplication unit 442 that does not employ Booth recoding logic. While the single pass multiplication micro instruction remains in the floating point execute stage, the interlock logic 450 inserts slips into the pipeline to prevent following micro instructions from prematurely advancing.

It is important to note that, because the 40 least significant bits of the significand of the multiplier are zeros, the first pass through the dual pass multiplication unit 442 produced an insignificant first partial product equal to zero. In fact, because dual pass multiplication units vary slightly in size, it can be stated that the first pass is unnecessary for any dual pass multiplication unit 442 having a multiplier capacity of 40 bits or less.

During cycle 70, the final product is generated and is placed into the result register 444. At this point, execution of the single precision multiply macro instruction is complete through the floating point execute stage.

As noted above, half of the 64 multiply cycles are essentially wasted in this example because the lower part of the multiplier contains zeros. And because the dual pass multiplier 442 treats all operands as extended precision operands, the first pass through the dual pass multiplier 442 consumes valuable execution time and produces a nonessential partial product. Incorporation of Booth recoding logic into the dual pass multiplier would reduce the overall number of cycles required to perform the single precision multiplication, however, one skilled in the art will agree that the first pass is, nonetheless, an unnecessary delay to the execution time for a single precision multiply macro instruction.

The example of FIGS. 4 and 5 shows that at approximately half of the pipeline cycles in a dual pass multiplication unit 442 are consumed performing useless data manipulations. Moreover, many floating point applications, particularly graphics applications, provide their operands for multiplication in single precision format. Consequently, for these applications, an extreme number of pipeline cycles are consumed by needless computations. This is a problem that seriously affects the overall execution time for a given application program. One skilled in the art will appreciate that elimination of unnecessary pipeline cycles in the execution of any micro instruction, without requiring additional hardware, is very desirable.

The present invention allows a microprocessor to execute a single precision multiply macro instruction without incurring the unnecessary expense of a first pass through a dual pass multiplication unit, thus essentially doubling the execution speed for the instruction; the unessential pipeline cycles are eliminated from its execution path.

Figure 6:
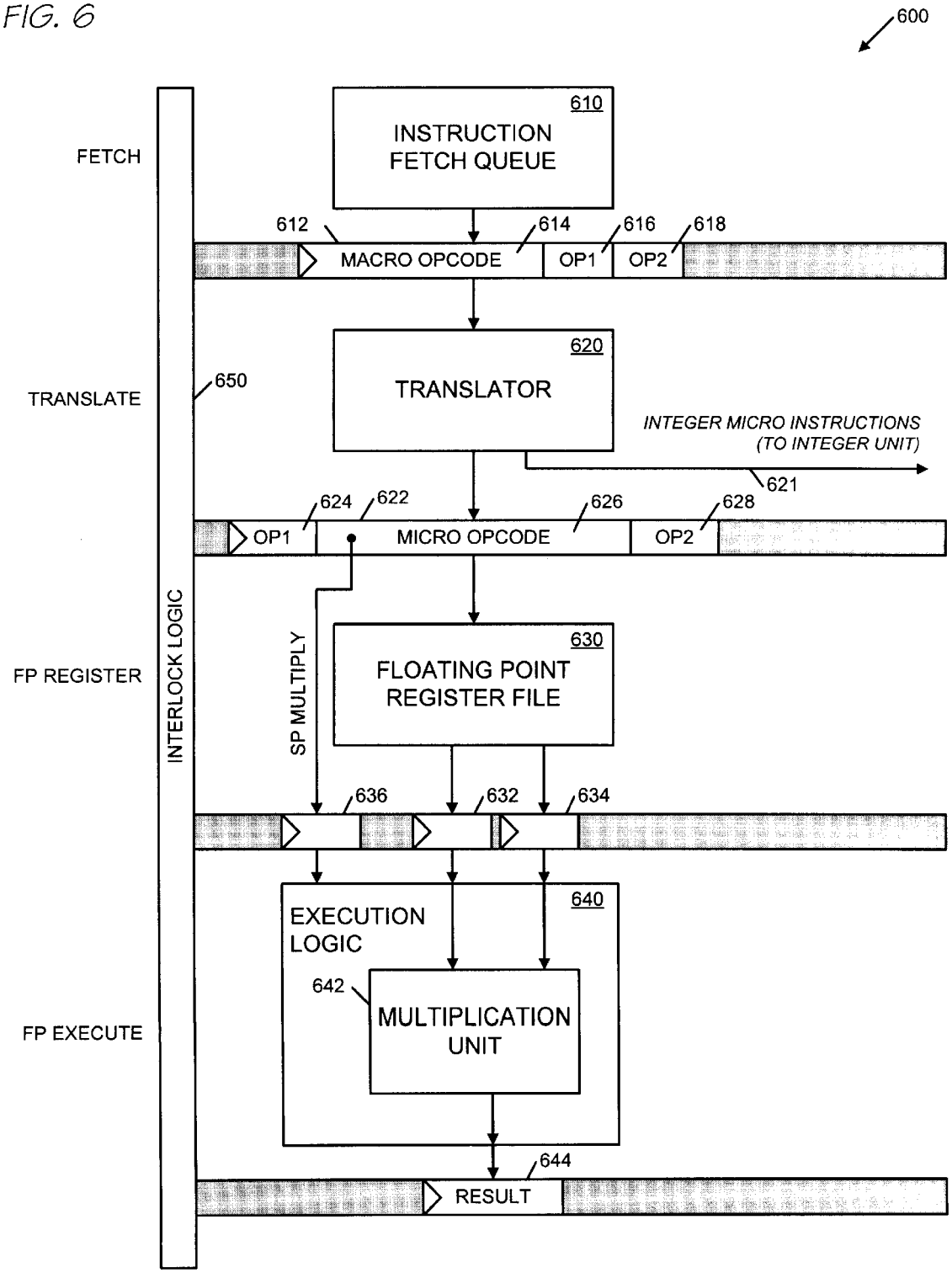
FIG. 6 is a block diagram of a microprocessor for performing single precision multiplication according to the present invention.

Now referring to FIG. 6, a block diagram of a microprocessor 600 for performing single precision multiplication according to the present invention is presented. For clarity, only those stages of the microprocessor 600 are shown that are relevant to this discussion. The block diagram shows four pipeline stages associated with execution of a single precision multiply macro instruction: fetch, translate, register, and execute. The microprocessor 600 also includes interlock logic 650.

The fetch stage has an instruction fetch queue 610 connected to an instruction buffer 612. The translate stage has translation logic 620 that provides outputs to a floating point micro instruction buffer 622. Outputs to an integer unit (not shown) are provided via bus 621. The floating point register stage has a floating point register file 630. Outputs of the floating point register file 630 are provided to first and second floating point operand registers 632, 634 and to a micro opcode register 636. The floating point execute stage includes floating point execution logic 640, which receives inputs from the first and second floating point operand registers 632, 634, and from the micro opcode register 636. The floating point execution logic 640 includes a multiplication unit 642 and provides an output to a floating point result register 644. Contents of the result register 644 are provided to the floating point write back stage so that they may be written back into the floating point register file 630.

The multiplication unit 642 is configured to perform multiplication of two extended precision operands in two passes, similar to that of FIG. 3. However, the multiplication unit 642 is distinguished in that, for single precision multiplication, the first pass of the multiplier through the unit 642 is not performed; only the bits of the multiplier significand that yield a significant second partial product are presented for multiplication. More specific operational details of the microprocessor 600 according to the present invention follow.

The instruction fetch queue 610 fetches macro instructions from memory (not shown) for execution by the microprocessor 600. The macro instructions are sequentially provided to the instruction buffer 612. The instruction buffer 612 has three fields: a macro opcode field 614, a first macro operand field 616, and a second macro operand field 618. In the case of a single precision multiply macro instruction, the macro opcode field 614 directs the microprocessor 600 to multiply a multiplicand, which has been previously stored in an architecturally defined register, by a multiplier. A memory address of the multiplier is prescribed by the first macro operand field 616. As before, the second macro operand field 618 does not contain an operand in the case of a single precision multiply instruction.

The translator 620 retrieves a macro instruction from the macro instruction buffer 612 and decodes it into an associated sequence of micro instructions. Micro instructions directed to the integer unit (not shown) are provided on bus 621. Micro instructions directed to the floating point unit are provided to the floating point micro instruction buffer 622. The floating point micro instruction buffer 622 has three fields. Contents of a micro opcode field 626 direct the floating point unit to perform a specific subtask. For a single precision multiplication, the micro opcode field 626 additionally instructs the floating point execution logic 640 to skip the first pass of the multiplier through the multiplication unit 642. Thus, contents of the micro opcode field 626 are provided to the micro opcode register 636. In addition, operands are provided in first and second micro operand fields 624, 628. In the event of a single precision multiply micro instruction, the micro operand fields 624, 628 would contain references to specific registers in the floating point register file 630 for execution of the multiplication. Thus, micro instructions are provided to the floating point unit of the microprocessor 600.

If the micro opcode so directs, contents of the floating point register file 630 are retrieved and placed into the first and second operand registers 632, 634. For a single precision multiply micro instruction, the multiplicand and multiplier, placed into the floating point register file 630 by preceding micro instructions, are retrieved and placed into the first and second operand registers 632, 634.

The floating point execution logic 640 retrieves the contents of registers 632, 634, and 636 and executes the subtask specified by the micro opcode. For execution of a single precision multiply micro instruction, the multiplicand and multiplier are retrieved from the registers 632, 634 and are provided to the multiplication unit 642 in extended precision format. In contrast to a conventional multiplication unit, rather than performing an extended precision multiplication operation in two passes, the multiplication unit 642 skips a first pass and only executes a second pass of the multiplier through the multiplication unit 642, thus eliminating unnecessary pipeline cycles. Only a part of the multiplier, having 24-significant bits present in the single precision significand, is passed through the multiplication unit 642 to compute a partial product. The partial product is left shifted accordingly to generate the final product. The final product is placed in the result register 644.

Because the single precision multiplication operation requires several pipeline cycles while in the multiplication unit 642, the interlock logic 650 inserts slips into the pipeline to preclude following instructions from prematurely advancing in the pipeline. Execution of a single precision multiply instruction according to the present invention is more completely illustrated with reference to FIG. 7.

Figure 7:
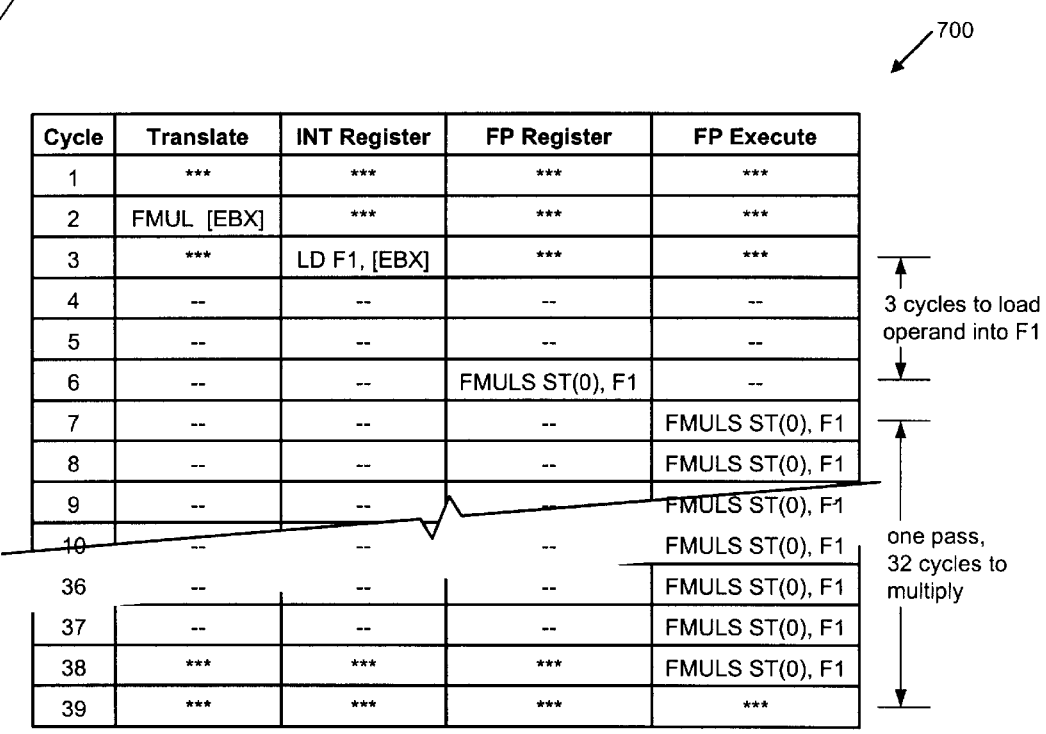
FIG. 7 is a table illustrating execution of a single precision multiplication instruction by the microprocessor of FIG. 6.

FIG. 7 is a table 700 illustrating execution of a single precision multiply instruction according to the present invention by the microprocessor 600 of FIG. 6. The single precision multiply instruction is designated by FMUL [EBX]. It directs the microprocessor 600 to perform integer division of a multiplicand contained in floating point register ST(0) by a single precision multiplier contained at a memory address prescribed by the contents of register EBX in the integer register file. In accordance with the technique for single precision multiplication described with reference to FIG. 6, the translator 620 decodes the single precision multiply instruction into a single precision load micro instruction, designated by LD F1,[EBX], and a single precision multiply micro instruction, designated by FMULS ST(0),F1. The single precision load micro instruction directs the microprocessor 600 to fetch the contents of the memory address prescribed by register EBX in the integer register file and place the contents in register F1 in the floating point register file 630. The single precision multiply micro instruction directs the floating point unit to multiply the multiplicand, previously loaded into register ST(0) in the floating point register file 630, by the multiplier that is stored in register F1. It additionally directs the multiplication unit 642 to skip the unnecessary multiplication pass involving bits of the multiplier significand that are equal to zero.

Progression of the micro instructions through the microprocessor 600 is shown with respect to cycles of a pipeline clock. Instructions before and after instructions of interest are designated by "*." Voids, or slips in the pipeline are designated by "--." As before, FIG. 6 only depicts those stages of the microprocessor pipeline that are relevant to this discussion. Hence, the fetch stage and write back stage are not shown. The integer register stage is shown, however, because the single precision load micro instruction is provided via bus 621** to the integer unit so the multiplier can be fetched from memory.

During cycle 2, the single precision multiply instruction, FMUL [EBX], proceeds through the translate stage of the pipeline. Therein, the translator 620 retrieves it from the macro instruction buffer 612 and decodes it into the two micro instructions described above.

During cycle 3, the single precision load micro instruction, LD F1, [EBX], proceeds through the integer register stage. As discussed with respect to FIG. 5, the table 700 does not depict the operations in the integer unit related to retrieving the multiplier because they are not relevant to the discussion. The table 700 does show, though, that three cycles of the pipeline clock are required the integer unit to load the multiplier into register F1. Consequently, contents of the memory address prescribed by the contents of register EBX, which are the single precision multiplier, are placed into register F1 of the floating point register file 630. Although the multiplier is in single precision format in memory, it is translated into extended precision format when provided to register F1: the 40 least significant bits of the significand of register F1 contain zeros. Also during cycle 3, a following macro instruction proceeds through the translate stage.

Because the multiplication operation cannot begin until the multiplier is placed into register F1, the interlock logic 650 inserts slips into the pipeline during cycles 4 and 5. At this point execution of the single precision load micro instruction is complete insofar as concerns this discussion.

During cycle 6, the single precision multiply micro instruction proceeds through the floating point register stage. Therein, the previously stored multiplicand is retrieved from register ST(0) in the register file 630 and is placed into register 632. Also, the multiplier is retrieved from register F1 and is placed in register 634. The micro opcode directing single precision multiplication is placed in register 636.

During cycle 7, the single precision multiply micro instruction proceeds through the floating point execute stage. Therein, the multiplicand and multiplier are retrieved from registers 632, 634, and the micro opcode is retrieved from register 636. Rather than providing the lower part of the multiplier to the multiplication unit 642 along with the multiplicand, the present invention provides only the upper part including the 24 bits in accordance with a single precision significand.

The table 700 shows 32 pipeline cycles dedicated to generation of the final product, which represents only a single pass through a 64-bit×32-bit multiplication unit 642-half of the number of cycles compared to that shown in FIG. 5. While the single pass multiplication micro instruction remains in the floating point execute stage, the interlock logic 650 inserts slips into the pipeline to prevent following micro instructions from prematurely advancing.

Because the 40 least significant bits of the significand of the multiplier are zeros, eliminating the first pass through the multiplication unit 642 simply eliminates computation of an insignificant partial product.

During cycle 38, the final product is generated by left shifting the partial product. The final product is then placed into the result register 644. At this point, execution of the single precision multiply macro instruction is complete through the floating point execute stage.

The example of FIGS. 6 and 7 shows that approximately half of the pipeline cycles consumed performing single precision multiplication in a dual pass multiplication unit are eliminated through use of the present invention. Those software applications that provide their operands for multiplication in single precision format, particularly graphics applications, reap the benefits of reduced overall execution time.

Moreover, the table 700 of FIG. 7 depicts a number of multiplication cycles for a multiplication unit that does not employ the Booth recoding algorithm. By employing Booth recoding logic, the overall number of cycles in an extended precision multiplication are reduced, however, single precision multiplication in the absence of the present invention still requires two passes through a multiplication unit. Thus, an alternative embodiment employing Booth recoding logic, also takes advantage of the present invention. In the alternative embodiment, the first, unnecessary pass through the multiplication unit is eliminated. There remains roughly a 50 percent savings in the number of cycles required to perform single precision multiplication.

Figure 8:
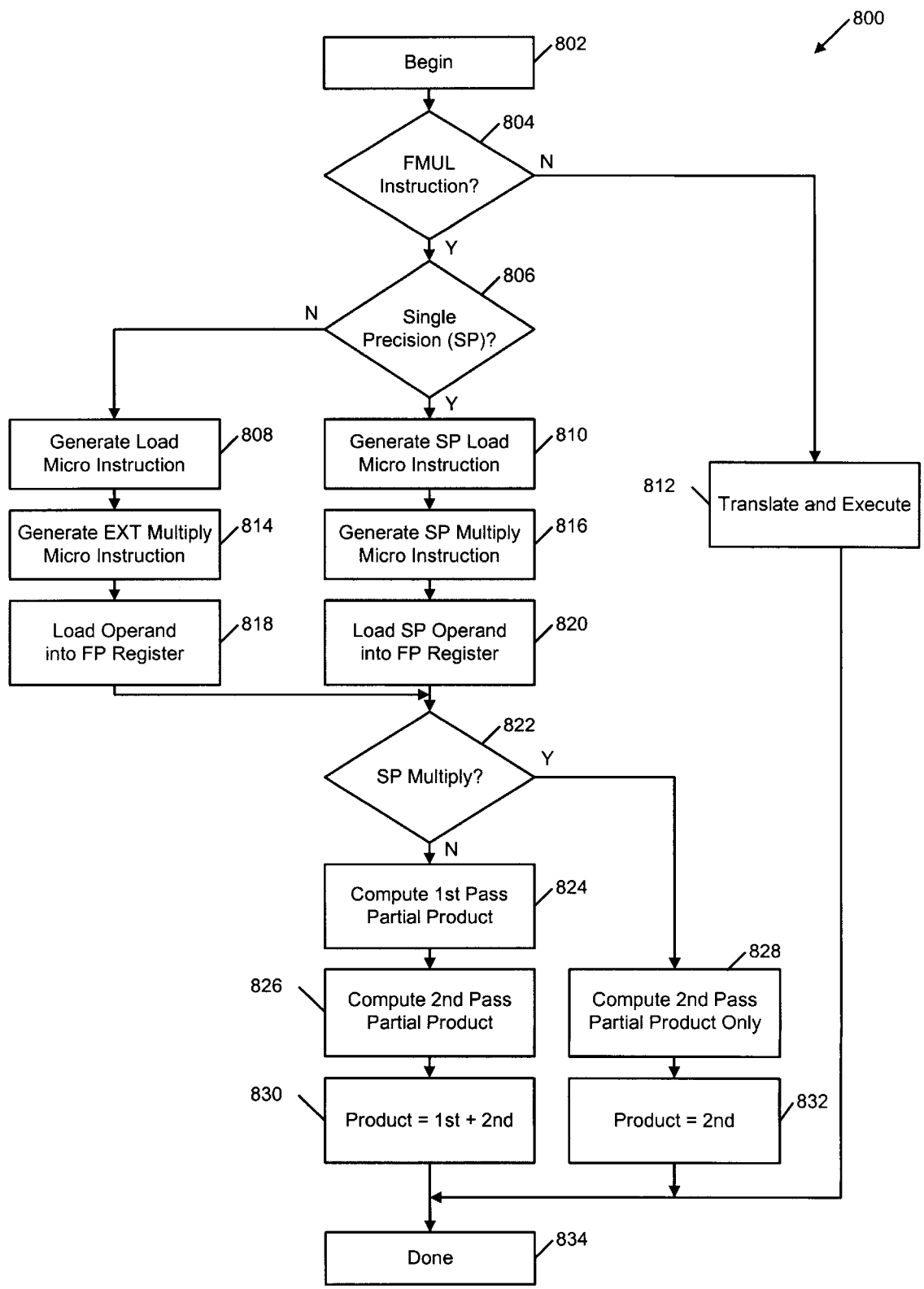
FIG. 8 is a flow chart illustrating a method for performing single precision multiplication in a microprocessor according to the present invention.

Now referring to FIG. 8, a flow chart 800 is presented illustrating a method for performing single precision multiplication in a microprocessor according to the present invention.

Flow begins at block 802 where a macro instruction is fetched from a macro instruction buffer. Flow then proceeds to decision block 804.

At decision block 804, the macro instruction is evaluated to determine whether it is a floating point multiplication instruction. If not, then flow proceeds to block 812. If so, then flow proceeds to decision block 806.

At block 812, the macro instruction is translated into an associated sequence of micro instructions, which are then executed by the microprocessor. Flow then proceeds to block 834.

At decision block 806, the floating point multiplication instruction is evaluated to determine if it is a single precision multiply instruction. If so, then flow proceeds to block 810. If not, then flow proceeds to block 808.

At block 810, a translator generates a single precision load micro instruction sequence directing the microprocessor to retrieve a single precision multiplier from memory or a register. Flow then proceeds to block 816.

At block 816, the translator generates a single precision multiply micro instruction sequence directing floating point execution logic in the microprocessor to skip a first pass through a multiplication unit when computing a product. Flow then proceeds to block 820.

At block 820, an integer unit in the microprocessor retrieves the single precision multiplier from memory and places it into a designated floating point register in extended precision format. Flow then proceeds to decision block 822.

At block 808, the translator generates a load micro instruction sequence according to the format prescribed by the floating point multiplication instruction. The sequence directs the microprocessor to retrieve a multiplier of prescribed format from memory or a register. Flow then proceeds to block 814.

At block 814, the translator generates a multiply micro instruction sequence according to the format prescribed by the floating point multiply instruction. The sequence directs the floating point execution logic in the microprocessor to execute two passes through a multiplication unit when computing a product. Flow then proceeds to block 818.

At block 818, the integer unit in the microprocessor retrieves the multiplier from memory and places it into a designated floating point register in extended precision format. Flow then proceeds to decision block 822.

At decision block 822, a multiplicand and the multiplier are provided to the floating point execution logic. The multiply micro instruction sequence is evaluated to determine if Single precision multiplication is prescribed. If so, then flow proceeds to block 828. If not, then flow proceeds to block 824.

At block 824, a first part of the multiplier, i.e., at least the lower half of its significand, is multiplied with the multiplicand to compute a first partial product. Flow then proceeds to block 826.

At block 826, a remaining part of the multiplier is multiplied with the multiplicand to compute a second partial product. Flow then proceeds to block 830.

At block 830, the second partial product is left-shifted in accordance with the size of the multiplication unit and is summed with the first partial product to produce a final product. Flow then proceeds to block 834.

At block 828, because the multiplier was provided from memory in single precision format, the lower 40 bits of its significand are equal to zero. Therefore, the single precision multiply micro instruction sequence causes the multiplication unit to compute a second pass partial product only using the upper portion of the multiplier containing the 24 bits in its original single precision significand. Flow then proceeds to block 832.

At block 832, a final product is produced by left-shifting the partial product computed in block 828. Flow then proceeds to block 834.

At block 834, the method completes.

Although the present invention and its objects, features, and advantages have been described in detail, other embodiments are encompassed by the invention. For example, the present invention has been particularly described in terms of single precision multiplication being performed in a microprocessor having dual pass multiplication unit. Improvement is achieved by skipping a pass associated with bits of an extended precision significand that are zero because of translation of a single precision significance. Common dual pass multiplication units are 64-bits×32-bits or 64-bits×40 bits. In either case, the first pass can be skipped when performing single precision multiplication. But, it is entirely within the scope of the present invention to encompass other multiplication unit variations, for example, a quadruple pass multiplication unit which is 64-bits×16-bits. Such an embodiment of the present invention would cause the first two passes of the multiplier through the multiplication unit to be skipped, and the product to be formed from partial products computed by the remaining two passes.

In addition, the present invention has been particularly characterized with regard to IEEE floating point number formats: single precision, double precision, and extended precision. However, improvements in data processing capabilities of microprocessors will result in future standard formats that comprise even greater numbers of bits in a significand. The present invention anticipates such improvements to the extent that needless passes through a multiple pass multiplication unit are eliminated.

Furthermore, the present invention has been characterized primarily with regard to performing single precision multiplication in a microprocessor. It is inconsequential, however, from what host platform the single precision multiplication is performed. Rather, the multiplication can be performed upon any platform an execution unit capable of multiplying binary data to include signal processors, embedded controllers, array processors, and industrial controllers.

Moreover, the present invention has been described in terms of a microprocessor having a floating point execution unit residing on the same integrated circuit, however, implementation of the present invention is also applicable to microprocessors having floating point units that reside on a separate integrated circuit. These separate floating point units are also known as numeric coprocessors.

In addition, the present invention has been particularly presented as executing an x86-compatible single precision floating point multiplication instruction. In the x86 instruction set, such multiplication is only allowed to be performed upon a single precision multiplier that is fetched from memory. However, use of the present invention is not constrained to the x86 instruction set. Single precision multiplication can be prescribed for a multiplier that resides in a floating point register, or any other architected register in a given microprocessor. Furthermore, a multiplier need not be provided in the single precision format in order for single precision multiplication to be prescribed. Although the examples provided herein depict single precision operands as having zeros in a 40-bit low order part when they are registered in extended precision format, use of the present invention is not precluded when the low order part does not contain zeros. A requirement for a single precision result when multiplying two extended or double precision operands can be quickly provided via the present invention.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for performing single precision floating point multiplication of a multiplicand by a multiplier, the multiplicand and the multiplier being provided in extended precision format, comprising:

a translator, configured to receive a single precision multiplication instruction, and configured to decode said single precision multiplication instruction into an associated single precision micro instruction sequence; and extended precision floating point execution logic, coupled to said translator, configured to receive said associated single precision micro instruction sequence, and configured to multiply the multiplicand by the multiplier to generate a single precision product, wherein said extended precision floating point execution logic normally performs a floating point multiplication by generating a low-order partial product followed by generation of a high-order partial product, said low-order partial product representing multiplication of a low-order part of an extended precision multiplier with an extended precision multiplicand, said high-order partial product representing multiplication of a high-order part of said extended precision multiplier with said extended precision multiplicand, wherein said low-order partial product is generated during a first traversal through said extended precision floating point execution logic and wherein said high-order partial product is generated during a second traversal through said extended precision floating point execution logic, and wherein, when said associated single precision micro instruction sequence is received said extended precision floating point execution logic generates said single precision product by executing only said second traversal to generate said high-order partial product, said high-order partial product comprising said single precision product.

2. The microprocessor as recited in claim 1, wherein the multiplier has a 64-bit significand, said 64-bit significand comprising:

a first part, containing 24 most significant significand bits; and a second part, containing 40 least significant significand bits.

3. The microprocessor as recited in claim 2, wherein said first part comprises a 24-bit significand resulting from translation of the multiplier from single precision format to extended precision format.

4. The microprocessor as recited in claim 3, wherein said second part comprises zeros.

5. The microprocessor as recited in claim 2, wherein said associated single precision micro instruction sequence is configured to prescribe single precision multiplication of the multiplicand by said first part of the multiplier.

6. The microprocessor as recited in claim 1, wherein said associated single precision micro instruction sequence comprises a single precision load micro instruction sequence, configured to direct the microprocessor to retrieve the multiplier from a memory address and to convert the multiplier from single precision format into extended precision format.

7. An apparatus in a microprocessor for performing single precision multiplication of a multiplicand by a multiplier, comprising:

a translator, configured to receive a single precision multiplication instruction, and configured to decode said single precision multiplication instruction into an associated single precision micro instruction sequence; and extended precision floating point execution logic, coupled to said translation logic, configured to receive and execute said associated single precision micro instruction sequence, said extended precision floating point execution logic comprising:

a multiplication unit, configured to perform two-pass extended precision multiplication and one-pass single precision multiplication, and configured to multiply the multiplicand by the multiplier to generate a single precision product, wherein the multiplicand and the multiplier are provided to said multiplication unit in extended precision format.

8. The microprocessor as recited in claim 7, wherein the multiplier has a 64-bit significand, said 64-bit significand comprising:

a first part, containing 24 most significant significand bits; and a second part, containing 40 least significant significand bits.

9. The microprocessor as recited in claim 8, wherein said first part comprises a 24-bit significand resulting from translation of the multiplier from single precision format to extended precision format.

10. The microprocessor as recited in claim 9, wherein said second part comprises zeros.

11. The microprocessor as recited in claim 8, wherein said associated single precision micro instruction sequence is configured to prescribe single precision multiplication of the multiplicand by said first part of the multiplier.

12. The apparatus as recited in claim 7, wherein said associated single precision micro instruction sequence comprises a single precision load micro instruction sequence, configured to direct the microprocessor to retrieve the multiplier from a memory address and to convert the multiplier from single precision format into extended precision format.

13. The apparatus as recited in claim 7, wherein said multiplication unit produces a high-order partial product, configured to represent multiplication of a high-order part of an extended precision multiplier with an extended precision multiplicand, wherein said high-order partial product is generated during a second traversal through said multiplication unit.

14. The apparatus as recited in claim 8, wherein said multiplication unit produces a low-order partial product, configured to represent multiplication of a low-order part of said extended precision multiplier with said extended precision multiplicand, wherein said low-order partial product is generated during a first traversal through said multiplication unit.

15. The apparatus as recited in claim 14, wherein said associated single precision micro instruction sequence directs said multiplication unit to only execute said second traversal to generate said high-order partial product.

16. The apparatus as recited in claim 15, wherein said single precision product comprises said high-order partial product.

17. A microprocessor for performing single precision multiplication, comprising:

a translator, configured to receive a single precision multiplication instruction, and configured to decode said single precision multiplication instruction into an associated single precision micro instruction sequence, comprising:

a single precision load micro instruction sequence, directing the microprocessor to retrieve an operand from a memory address and to convert said operand into an extended precision multiplier; and a single precision multiply micro instruction sequence, directing single precision multiplication of an extended precision multiplicand by said extended precision multiplier;

floating point execution logic, coupled to said translation logic, configured to receive and execute said single precision multiply micro instruction sequence, said floating point execution logic comprising:

a multiplication unit, configured to perform two-pass extended precision multiplication and one-pass single precision multiplication, and configured to multiply the multiplicand by the multiplier to generate a single precision product, wherein the multiplicand and the multiplier are provided to said multiplication unit in extended precision format.

18. A method in a microprocessor for performing single precision multiplication of a multiplicand by a multiplier, comprising:

a) translating a floating point single precision multiply instruction into an associated single precision multiply micro instruction sequence which prescribes single precision multiplication of a multiplicand by a multiplier, the multiplicand and the multiplier being registered in the microprocessor as extended precision operands; and b) performing the single precision multiplication to produce a single precision product in a single pass through an extended precision multiplication unit, the extended precision multiplication unit being configured to perform multiplication of two extended precision operands in two passes through the multiplication unit.

19. The method as recited in claim 18, wherein said translating comprises:

generating a single precision load micro instruction sequence, directing the microprocessor to load the multiplier in extended precision format; and generating a single precision micro instruction sequence, directing the extended precision multiplication unit only perform the single pass through the extended precision multiplication unit, the single pass executing multiplication of the multiplicand by a part of the multiplier including 24 bits in accordance with a 24-bit single precision significand.

* * * * *